United States Patent
Bücker et al.

(10) Patent No.: US 7,793,464 B2
(45) Date of Patent: Sep. 14, 2010

(54) MULTIFUNCTIONAL SUPPORT FOR A MOTOR VEHICLE DOOR

(75) Inventors: Rolf Bücker, Bamberg (DE); Dirk Leve, Neuss-Allerheiligen (DE); Martin Schlechtriemen, Breitengüssbach (DE); Christoph Bunzel, Wuppertal (DE)

(73) Assignee: Brose Fahrzeugteile GmbH & Co. KG, Coburg (DE)

( * ) Notice: Subject to any disclaimer, the term of this patent is extended or adjusted under 35 U.S.C. 154(b) by 977 days.

(21) Appl. No.: 10/559,604

(22) PCT Filed: Jun. 4, 2004

(86) PCT No.: PCT/DE2004/001226

§ 371 (c)(1),
(2), (4) Date: Dec. 2, 2005

(87) PCT Pub. No.: WO2004/108454

PCT Pub. Date: Dec. 16, 2004

(65) Prior Publication Data

US 2006/0117665 A1    Jun. 8, 2006

(30) Foreign Application Priority Data

Jun. 6, 2003   (DE) .......................... 203 09 170 U

(51) Int. Cl.
*B60J 5/04* (2006.01)
(52) U.S. Cl. .......................... 49/502; 49/348
(58) Field of Classification Search .............. 49/502, 49/348, 349, 352, 351
See application file for complete search history.

(56) References Cited

U.S. PATENT DOCUMENTS

| | | | | | |
|---|---|---|---|---|---|
| 4,329,816 | A | * | 5/1982 | Koike | 49/350 |
| 5,377,450 | A | * | 1/1995 | Varajon | 49/502 |
| 5,469,664 | A | * | 11/1995 | Staser et al. | 49/452 |
| 5,535,553 | A | * | 7/1996 | Staser et al. | 49/502 |

(Continued)

FOREIGN PATENT DOCUMENTS

DE    195 11 294 A1    10/1996

(Continued)

OTHER PUBLICATIONS

English translation of International Preliminary Examination Report for corresponding PCT application No. PCT/DE2004/001226, dated May 1, 2006.

(Continued)

*Primary Examiner*—Gregory J. Strimbu
(74) *Attorney, Agent, or Firm*—Christie, Parker & Hale, LLP

(57) ABSTRACT

A multifunctional support for use in a motor vehicle includes a retaining section for fastening the multifunctional support to an assembly support of a door of the motor vehicle. The multifunctional support further includes a longitudinal window guide linked with the retaining section for guiding a window pane, and fastening locations for fastening a door lock to the multifunctional support. The retaining section is linked with the window guide along a longitudinal subsection of the multifunctional support. The retaining section, in a terminal zone of the longitudinal subsection, is linked with the window guide in a substantially rigid manner and is linked with the window guide in another terminal zone of the longitudinal subsection in a flexible manner.

23 Claims, 5 Drawing Sheets

U.S. PATENT DOCUMENTS

| | | | | |
|---|---|---|---|---|
| 5,752,346 A | * | 5/1998 | Kritzler et al. | 49/503 |
| 5,832,667 A | * | 11/1998 | Buening et al. | 49/212 |
| 6,425,208 B1 | * | 7/2002 | Klueger et al. | 49/502 |
| 6,438,899 B1 | * | 8/2002 | Feder et al. | 49/502 |
| 6,516,493 B1 | * | 2/2003 | Seliger et al. | 16/96 R |
| 6,536,164 B1 | * | 3/2003 | Kirejczyk | 49/502 |
| 6,640,500 B1 | * | 11/2003 | Stout | 49/502 |
| 6,823,628 B2 | * | 11/2004 | Morrison et al. | 49/502 |
| 6,931,791 B1 | * | 8/2005 | Pleiss | 49/502 |

FOREIGN PATENT DOCUMENTS

| | | |
|---|---|---|
| DE | 299 12 034 U1 | 10/1999 |
| DE | 299 16 066 U1 | 8/2000 |
| WO | WO 01/07277 A1 | 2/2001 |
| WO | WO 02/28672 A1 | 4/2002 |

OTHER PUBLICATIONS

International Search Report, dated Nov. 2, 2004, corresponding to PCT/DE2004/001226.

* cited by examiner

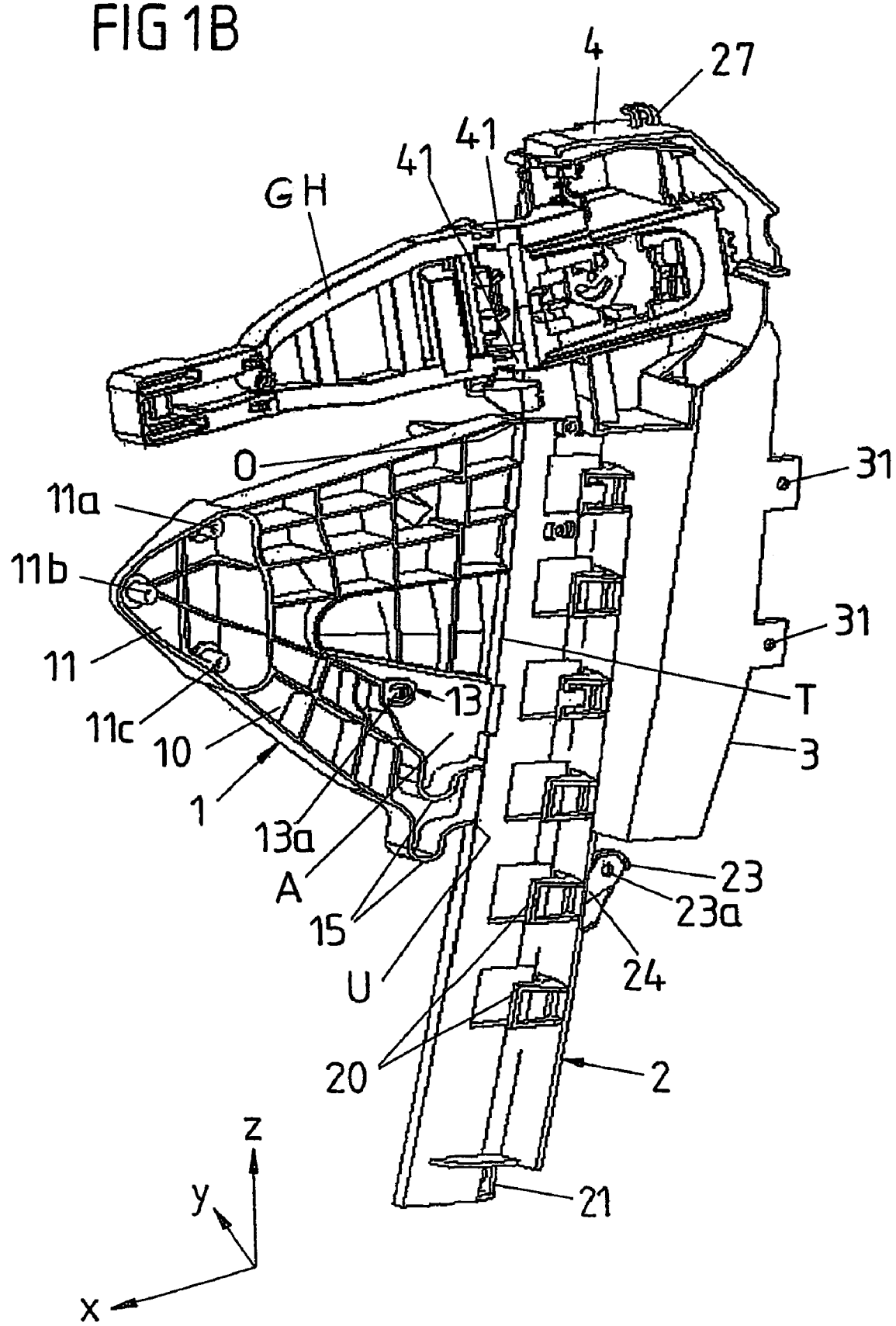

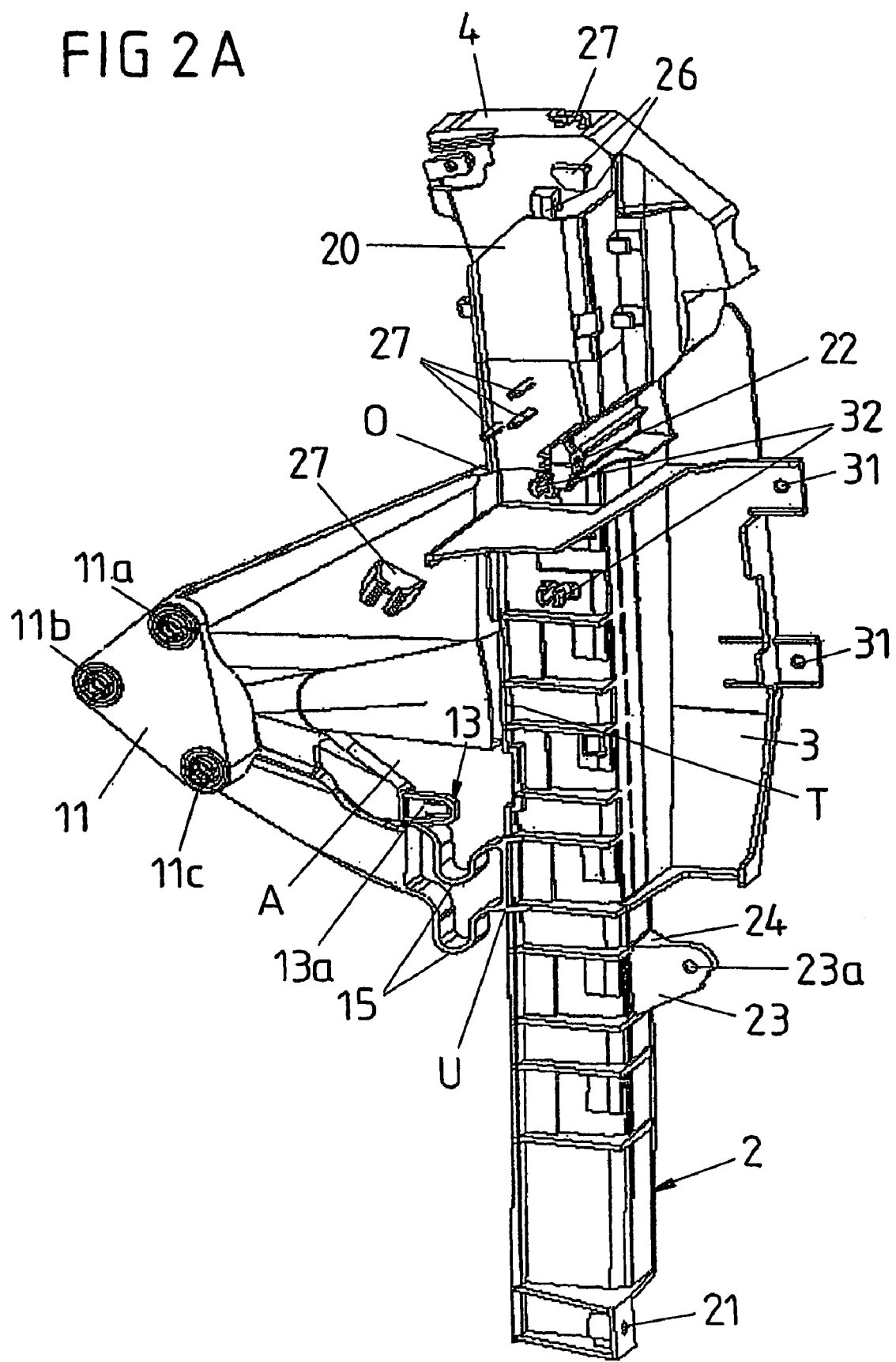

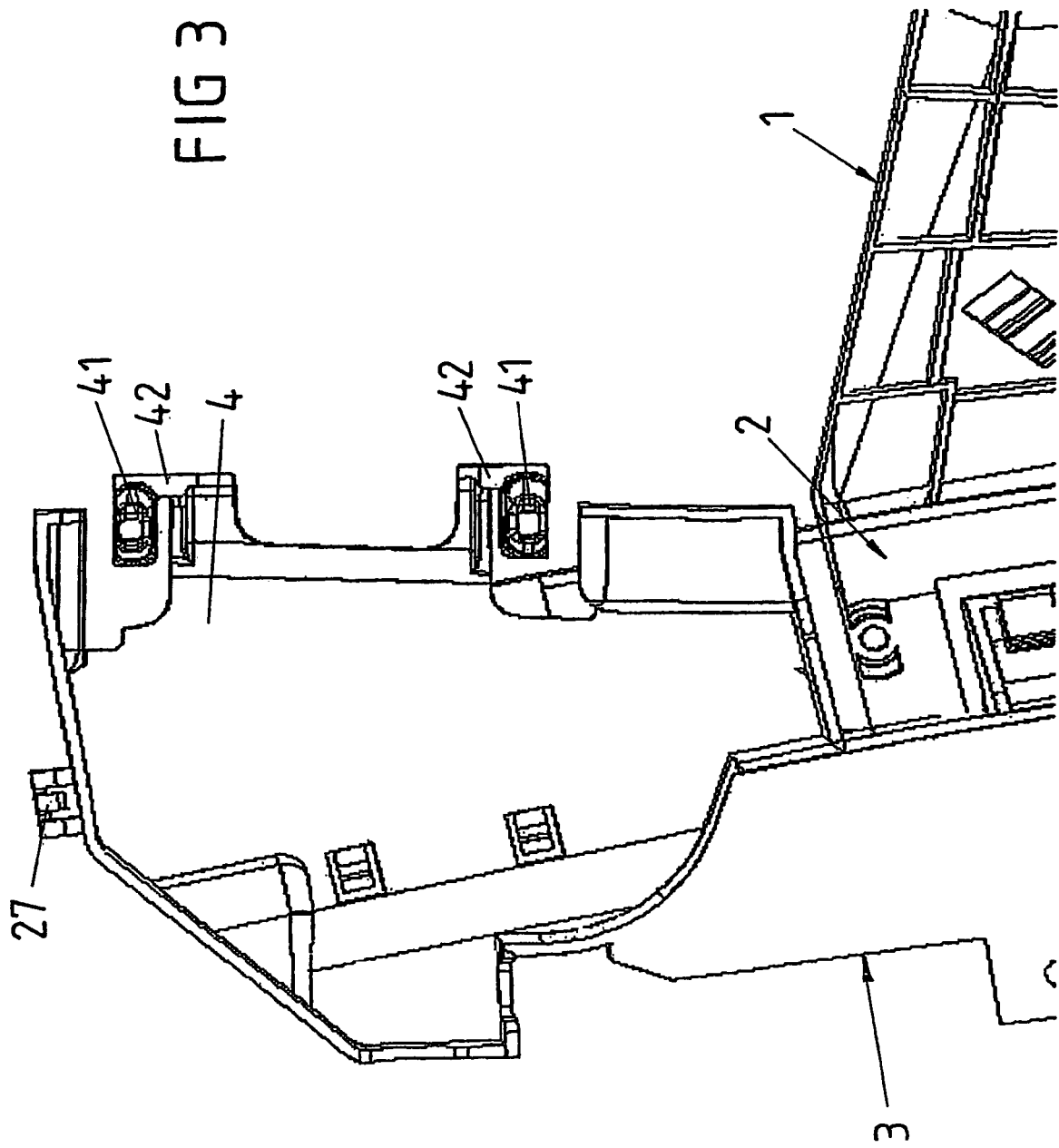

MULTIFUNCTIONAL SUPPORT FOR A MOTOR VEHICLE DOOR

CROSS-REFERENCE TO A RELATED APPLICATION

This application is a National Phase Patent Application of International Application Number PCT/DE2004/001226, filed on Jun. 4, 2004, which claims priority of German Utility Model Number 203 09 170.1, filed on Jun. 6, 2003.

BACKGROUND

The invention relates to a multifunctional support for a motor vehicle.

A multifunctional support of this kind comprises a retaining section provided with fastening points for fastening the multifunctional support to an assembly support of a motor vehicle door; a longitudinally extended guide connected to the retaining section for guiding a side edge of a window pane in a motor vehicle, more particularly in the form of a guide channel; as well as fastening points for fastening a door lock to the multifunctional support whereby the retaining section of the multifunctional support is connected to the window pane guide along a subsection of the guide which is extended between two terminal zones.

A multifunctional support of this kind as known for example from German Patent Application No. 195 294 A1 serves for pre-fitting a door lock, which is fastened on the multifunctional support, as well as prefitting the window guide, which is integrated in the multifunctional support, on an assembly support in the form of a door module support which is then fastened together with the multifunctional support on a motor vehicle door, e.g. a door inside panel or a door frame of a motor vehicle door. After fixing the assembly support on the motor vehicle door the door lock as well as the window guide are then fastened themselves to the body parts of the motor vehicle door. As a result of fastening the assembly support supporting the multifunctional support to the vehicle door on the one hand, and the structural groups—door lock and window guide—mounted on the multifunctional support to the vehicle door on the other hand, the fastening system requires a finely tuned match so that as a result of the tolerances in the individual structural groups there can be difficulties when connecting same with the motor vehicle door.

Alternatively the assembly support on which the multifunctional support is prefitted can also be formed directly through the door inside trim itself, more particularly the door inside panel.

It is therefore expedient for the assembly to provide on the multifunctional support means which when fastening the individual structural groups of the multifunctional support, more particularly the door lock and window guide, on the door body enable the tolerances to be compensated. However there is then the problem here that a correspondingly flexible design of the multifunctional support can lead to deterioration in the stability thereof.

SUMMARY

The object of the invention is therefore to improve a multifunctional support of the type mentioned at the beginning, more particularly to enable the compensation of tolerances during assembly but still with sufficient stability in the multifunctional support.

According to this the retaining section is in one terminal zone of the elongated subsection of the multifunctional support (along which the retaining section is linked to the window guide) connected substantially rigidly to the window guide and in the other terminal zone in the longitudinal direction of the elongated subsection is connected flexibly to the window guide, i.e. through an elastically or plastically deformable region.

The terms "substantially rigidly" on the one hand and "flexibly" on the other are thereby to mean that a relative movement between the retaining section of the multifunctional support and the window guide which is necessary during assembly for the purposes of tolerance compensation takes place substantially through a deformation of the flexible link between the retaining section and the window guide in the corresponding terminal zone of the elongated subsection whilst substantial deformation takes place in the region of the rigid link between the retaining section and window guide during assembly.

The solution according to the invention has the advantage that it also guarantees at the same time with sufficient flexibility a particular stability of the multifunctional support in that a flexible link between the retaining section and the window guide is combined with a rigid link. It is thereby important that the flexible link takes place in one terminal zone of the subsection along which the retaining section is connected to the window guide whilst in the other terminal zone of the elongated subsection there is a rigid link. A correspondingly long lever arm is hereby provided for the deflection of the retaining section relative to the window guide in the first mentioned terminal zone of the subsection.

Providing a recess between the two terminal zones of the elongated subsection of the multifunctional support causes a certain decoupling of the flexible link from the rigid link of the retaining section on the window guide so that a sufficient deflection of the window guide relative to the retaining section of the multifunctional support is guaranteed in the region of the flexible link.

The door lock itself (or where applicable a different function element which is to be prefitted) is mounted on the multifunctional support in the region of the flexible connection of the retaining section with the window guide in order to enable the door lock to be positioned during assembly whilst compensating tolerances.

In a concrete embodiment the solution according to the invention is produced in that the retaining section of the multifunctional support projects from the window guide along the elongated subsection and is thereby connected substantially rigid to the one terminal zone of the subsection and through at least one deformation device to the other terminal region of the subsection. The deformation device which is provided for flexibly linking the retaining section to the second terminal zone of the elongated subsection is thereby formed through an elastically (or where applicable plastically) deformable region of the multifunctional support.

The deformable region can be formed for example on the retaining section and/or on the window guide and is thereby integrated in one piece into the multifunctional support.

The multifunctional support in turn is formed by one integral moulded, plastics, more particularly injection moulded structural group which contains the retaining section as well as the window guide as one-piece units.

The flexible link between the retaining section and the window guide enables in particular a deflection of the retaining section along a direction perpendicular to the extension direction of the window guide which serves to compensate tolerances. If the multifunctional support is installed in a motor vehicle door then the window guide extends along the vertical vehicle axis; consequently the flexible link between the window guide and the retaining section of the multifunctional support enables tolerances to be compensated along a horizontal vehicle axis, more particularly along the vehicle longitudinal axis or where applicable the horizontal vehicle transverse axis which runs perpendicular thereto.

The fastening points for the door lock are provided on the multifunctional support on either side of the deformable region, namely at least one fastening point on the retaining section and at least one further fastening point on the window guide of the multifunctional support.

According to a further preferred embodiment of the invention at least one fastening point on the one side of the deformable zone, namely in particular the fastening point provided on the window guide, is designed for producing a rigid connection, e.g. in the form of a fastening opening for a screw or rivet, and at least one fastening point provided on the other side of the deformable zone, more particularly on the retaining section is designed for producing a connection with play, e.g. with a detent as stop. The play connection can be produced through a sliding guide which extends along the direction along which the window guide can move (deflect) relative to the retaining angle, thus in particular along the vehicle longitudinal axis. Through the ability of the door lock connected thereto to move relative to the one fastening point it is ensured that the bridging of the deformation zone through the door lock does not impair the function of the deformation zone.

Furthermore the one fastening point for the door lock is advantageously linked or formed flexible with the multifunctional support so that the position of this fastening point during assembly can be changed slightly for the purposes of compensating tolerances, namely in particular along the horizontal transverse axis (substantially at right angles to the sliding guide of the one fastening point).

For the most torsional-resistant fastening of the window guide on the door body, more particularly on one end side of a vehicle door, at least one fastening point is disposed on each upper and lower end of the window guide. This is particularly important since when slamming a vehicle door there is a considerable strain on the window guide through the resulting torque. Since a fastening point for the door lock is mounted between the two fastening points through which the window guide is fastened on the door body forces can still furthermore be introduced into the door lock. This fastening point should thereby be configured so that transverse forces which occur when the vehicle door is slammed are not only directed through the corresponding fastening means, e.g. a rivet or screw from the window guide to the door lock but that rather the corresponding fastening point bears with a flat surface area against the door lock so that force can be introduced over a correspondingly wider surface area. The strain on the fastening means itself is thereby to be minimised; and the transverse forces (acting along the horizontal vehicle transverse axis) are transferred from the composite door lock and window guide into the door body.

The corresponding forces are then further diverted from the door lock into the vehicle body on which the door lock is indeed additionally fastened.

Furthermore fastening points for a cover element in the form of a safety cover can be provided on the multifunctional support in order to protect endangered lock parts from manipulation (anti-theft safeguard).

Furthermore the multifunctional support can be provided with a bearing section for a door outside handle holder which serves to house the outside handle of a vehicle door. Since the position of the door outside handle is fixed through the position of the door outside skin of the corresponding motor vehicle and on the other hand the position of the bearing section of the multifunctional support is defined through its link with the door inside skin (through the assembly support) means are also required here for compensating tolerances which can be produced through designing the bearing section flexible in some sections, i.e. elastically or plastically deformable in some sections.

Finally holders for electric cables can also be moulded onto the multifunctional support, more particularly for door locks with so-called "keyless entry", thus for locks which can be actuated through signals of a chip of an authorised user and which consequently have to be contacted through suitable signal leads.

BRIEF DESCRIPTION OF THE DRAWINGS

Further features and advantages of the invention will now be explained in the following description of examples with reference to the drawings.

FIG. 1b shows a further perspective view of a multifunctional support for a passenger door of a motor vehicle on which a holder is fastened for a door outside handle;

FIG. 2a shows a perspective view of a multifunctional support corresponding to FIGS. 1a and 1b but for fastening on a driver door of a motor vehicle;

FIG. 3 shows an enlarged view of a bearing section of the multifunctional support on which a handle holder can be fastened for a door outside handle.

DETAILED DESCRIPTION

Figure 1A:
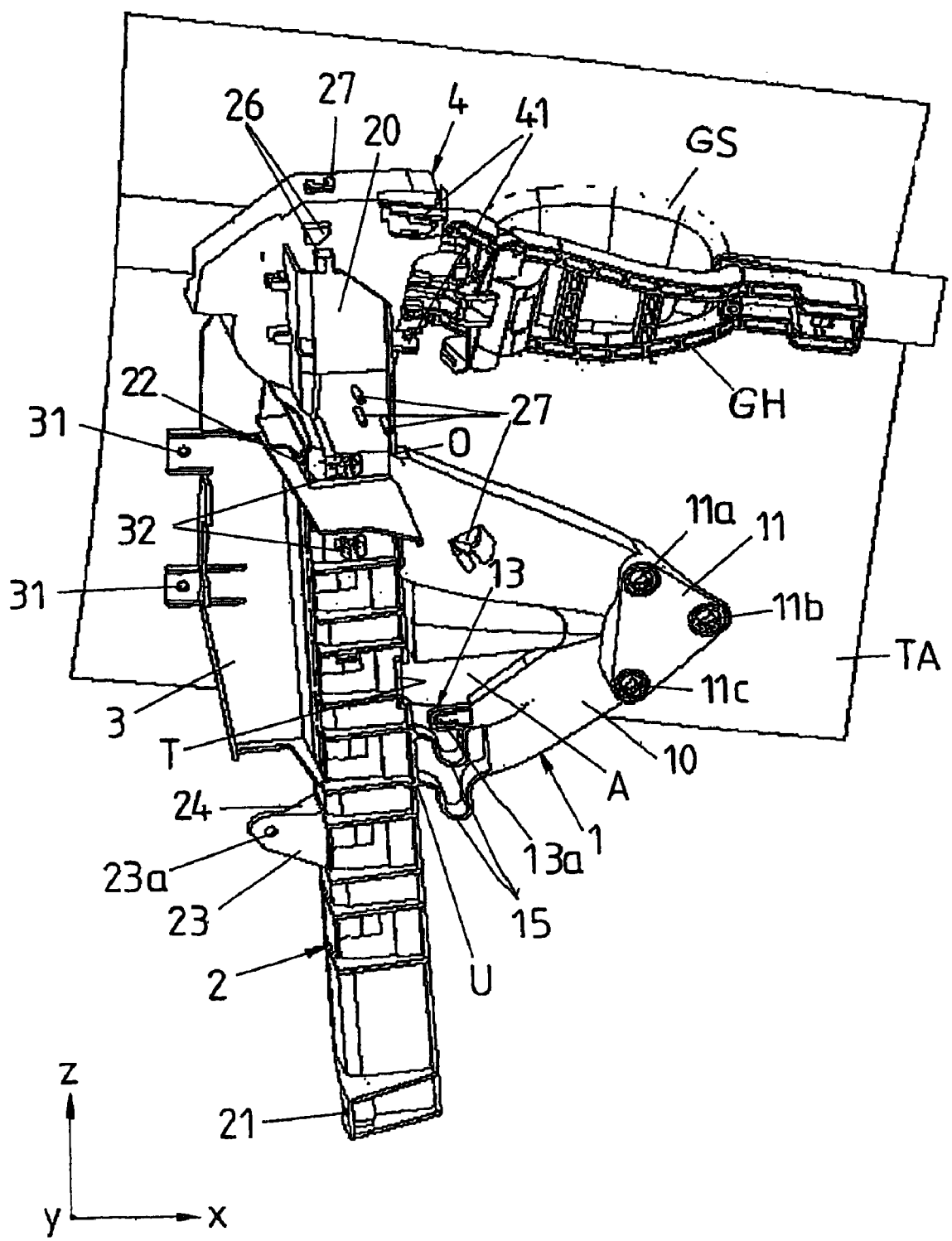
FIG. 1a shows a perspective view of a multifunctional support for a passenger door of a motor vehicle on which a holder is fastened for a door outside handle.
Figure 2B:
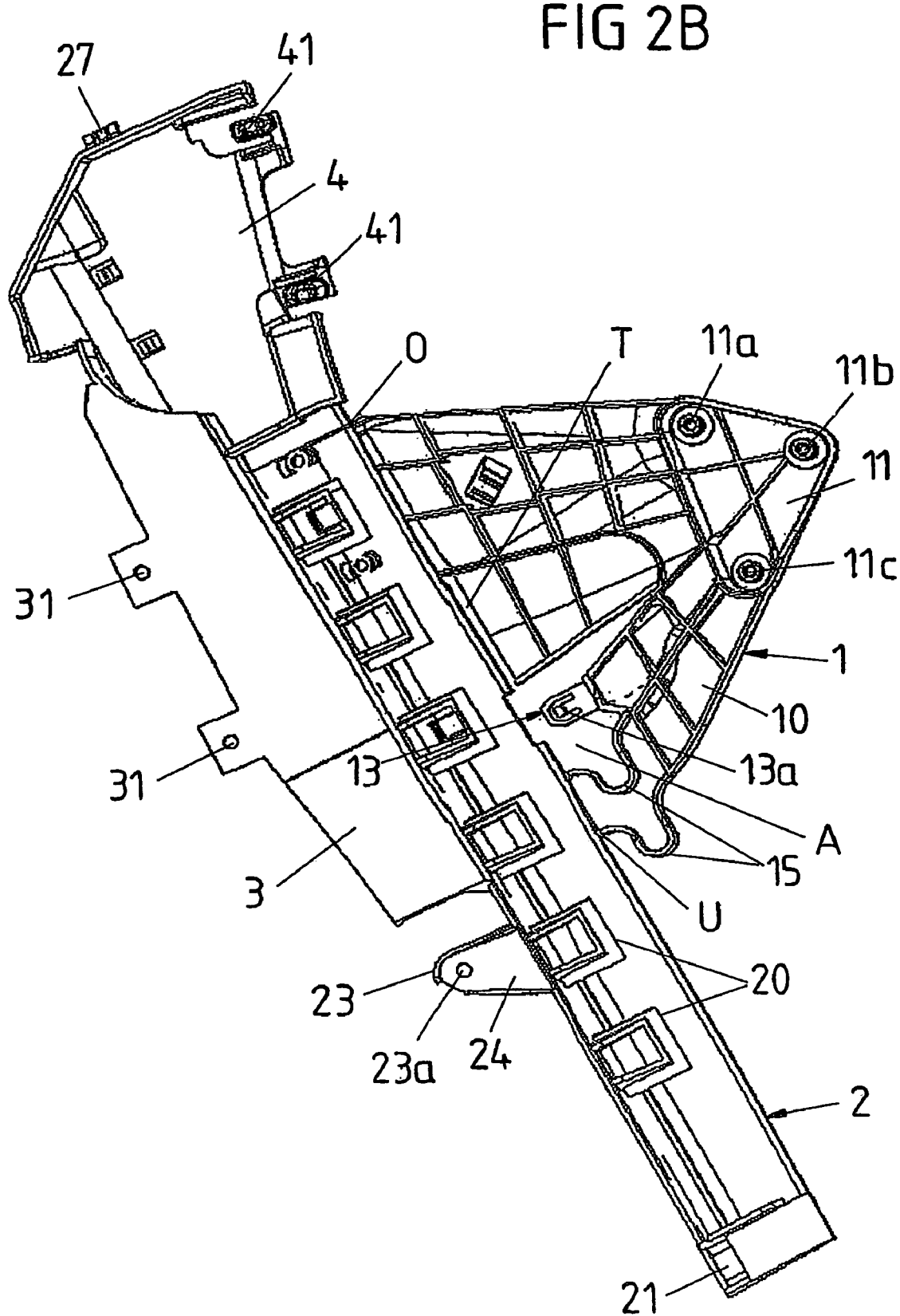
FIG. 2b shows a further perspective views of a multifunctional support corresponding to FIGS. 1a and 1b but for fastening on a driver door of a motor vehicle.

FIGS. 1a and 1b as well as 2a and 2b each show a multifunctional support for a motor vehicle door whereby the multifunctional support shown in FIGS. 1a and 1b is designed and provided for a passenger door and the multifunctional support illustrated in FIGS. 2a and 2b is designed and provided for a driver door. The two multifunctional supports consist of matching components; they are merely designed mirror-symmetrical—corresponding to their arrangement on a passenger door or driver door.

The relevant multifunctional support is formed (injection moulded) in one piece from plastics and has as the essential constituent parts a retaining section 1 and a window guide 2. The retaining section 1 is formed by a retaining angle 10 protruding from the window guide 2 and the window guide 2 forms a guide channel 20 for guiding a side edge of a (vertically adjustable) window pane of the corresponding vehicle door.

The retaining section 1 formed by the retaining angle 10 is provided for fastening on an assembly support and has for this a fastening region 11 with fastening points 11a, 11b, 11c which are provided for a rivet or screw fastening of the retaining angle 10 on the assembly support. The assembly support is typically a support plate on which different functional components of a motor vehicle, such as e.g. a window lifter, an airbag module, speaker as well as the multifunctional support illustrated in the drawings, can be pre-fitted away from the vehicle door and assembled into one pre-checkable door module. The assembly support is then fastened together with the functional components previously fitted thereon, onto the inside of a vehicle door, e.g. the door inside skin or an inner door frame.

The window guide 2 forms by the guide channel 20 a lateral engagement for a side edge of a vertically adjustable window pane, is designed longitudinally extended and is connected integral with the retaining angle 10 through a subsection T of its longitudinal extension between an upper terminal zone O and a lower terminal zone U. The extension direction z of the window guide 1 corresponds in the installed state of the multifunctional support to the vertical vehicle axis (z-axis), corresponding to the extension direction of the side edges of a window pane.

The window guide is provided at its lower end and at its upper end each with a fastening opening 21 and 22 by which it can be fastened through screws or rivets on the B-pillar end side of a vehicle door.

Furthermore elastic damping guide means 26 (expanders) are provided on the window guide 2 above the guide channel 20 and these can consist for example of flocked rubber and are to ensure optimum entrance of a window pane into the guide channel 20 by widening out the upper free end thereof. The spacing of the guide means 26 is greater than the internal width of the guide channel.

Furthermore holders 27 for electrical cables are moulded on the window guide 2 and partially also on the retaining angle 10 and can serve for example to transmit signals for a keyless-entry-system.

On the side of the window guide 2 away from the retaining angle 10 in the vehicle longitudinal direction x is a moulded fastening section 3 which has two fastening points 31 in the form of fastening openings which serve to fasten a lock cover (anti-theft lock device) through rivets. With a cover of this kind it is possible to prevent tampering of a door lock which is to be fastened on the multifunctional support in a manner still to be explained below. As further fastening points for this cover two positive locking elements 32 in the form of detent or clip elements are formed on the window guide 2.

At the upper end along the vertical vehicle axis z a bearing section 4 is formed on the window guide 2 and has fastening points 41 for an outside handle holder GH in the form of a bearing bracket on which the handle shell GS of a door outside handle can be fastened, see FIG. 3. The handle shells GS are to be mounted on the outside skin TA of the door. On the other hand the handle holder GH which is designed as a bearing bracket is connected to the inside skin of the door through the multifunctional support and an assembly support. Accordingly, in order to serve both the handle shell GS and the handle holder GH, the bearing points 41 for the handle holder GH are connected to the bearing section 4 through flexible (elastically deformable) retaining brackets 42. This resilient and flexible link of the fastening points 41 on the bearing section 4 through the retaining brackets 42 makes it possible to compensate the tolerances along the horizontal vehicle transverse axis y, i.e. perpendicular to the vertical vehicle axis z and perpendicular to the vehicle longitudinal axis x during assembly of the door outside handle.

Finally two fastening points 13, 13a and 23, 23a are provided on the multifunctional support for fastening a door lock. The one fastening point 13, 13a is formed on the retaining angle 10 of the multifunctional support, has a sliding guide 13a extending in the vehicle longitudinal direction with a detent element as the stop and projects over a recess A of the retaining angle 10. The other fastening point 23, 23a is formed by a fastening opening 23a in a fastening block 23 which is moulded on the window pane guide 2 and protrudes therefrom and which furthermore has a reinforcement rib 24.

This fastening point 23, 23a serves to fasten the door lock on the multifunctional support by a rivet or screw connection. The corresponding door lock is furthermore connected directly to the door body, like the window guide 2.

The second fastening point 23, 23a for the door lock is located on the window guide 2 between its lower fastening point 21 and its upper fastening point 22 so that forces and moments which act on the window guide as the door is slammed shut are diverted not only through the fastening points 21, 22 but furthermore also through the door lock. The fastening block 23 is thereby designed so that it can bear with a flat surface against the door lock which is to be fastened. Forces and moments can hereby be diverted not only through the fastening means used but also directly through the adjoining faces of the fastening block 23 and door lock.

Between the two fastening points 13, 13a; 23, 23a for the door lock a deformation area 15 is formed on the retaining angle 10 in the vicinity of the lower terminal zone U of the elongated subsection T along which the retaining angle 10 protrudes from the window guide 2, with this deformation area being deformable along the vehicle longitudinal axis x and thus enabling a displacement of the retaining angle 10 relative to the window guide 2 along the vehicle longitudinal axis x in the region of the lower end U of the subsection T of the window guide 2. In the region of the upper end O of the subsection T the retaining angle 10 is connected rigidly to the window guide 2 however. Thereby a recess A is provided in the retaining angle 10 in a region between the upper terminal zone O of the subsection T and its lower terminal zone U and this recess partially decouples the upper part of the retaining angle 10 which is coupled to the window guide 2, from its lower part which is connected flexibly and resiliently to the window guide 2. The retaining section 10 can hereby be deflected at the lower terminal zone U of the subsection T relative to the window guide 2 whereby the rigid link to the upper terminal zone O acts like a fulcrum.

By the sliding guide 13a of the first fastening point 13, 13a it is possible for the door lock to slide along the vehicle longitudinal axis x restricted relative to its fastening point 13, 13a, corresponding to the deformability of the deformation region 15 along this direction. The displacement of the door lock in the sliding guide 13a is thereby restricted through stops at the ends of the sliding guide. As a result of this displaceable play fastening of the door lock on the one fastening point 13, 13a it is reached that an elastic deformation of the deformation region 15 during assembly of the door lock or of the window guide 2 on the door body can be accompanied by a corresponding movement of the door lock relative to the one fastening point 13, 13a so that the door lock does not impede the movement of the window guide 2 relative to the retaining section 10 which is involved with the deformation of the deformation region 15. Through the elastic formation and link of the first fastening point 13, 13a a certain movement of the door lock fastened on the multifunctional support is still possible along the horizontal vehicle transverse axis y.

Overall by the two fastening points 13, 13a; 23, 23a of which the one enables a moveable fastening of the door lock and the other a rigid fastening of the door lock, a sufficiently stable and at the same time flexible link of the door lock on the multifunctional support can be achieved.

Furthermore through the flexible link of the window guide 2 through the deformation region 15 provided for this purpose to the retaining angle 10 (by which the multifunctional support is fastened on an assembly support of a motor vehicle door) as well as through the complementing movable and flexible link of the door lock, which is to be mounted on the multifunctional support, by the resilient fastening point 13, 13a it is reached that after fastening the multifunctional support together with an assembly support on a vehicle body an additional independent direct fastening of the window guide 2 as well as of the door lock to be mounted on the multifunctional support onto the door body is ready possible—with a compensation of tolerances.

During assembly the procedure is such that first away from the vehicle door which is to be fitted out the multifunctional support is fastened together with the components prefitted thereon, more particularly an outside handle holder, a door lock as well as a lock cover as an anti-theft lock device, to an assembly support which can furthermore also support other functional groups of a motor vehicle door, such as e.g. a window lifter, an airbag module, speaker and the like. This assembly support is then fastened together with the multifunctional support as well as the other functional groups fastened thereon, onto a door body. Then first the door lock fastened on the multifunctional support (by the fastening points 13, 13a; 23, 23a provided for this purpose) and then the window guide 2 (through the fastening points 21, 22 provided for this purpose) are fastened additionally onto the door body whereby through the elastic, movable link both of the door lock and also of the window guide 2 on the retaining angle 10 tolerances can be compensated and over-specification of the system during assembly can be avoided.

Independently of this the fastening of the outside handle holder GH onto the door outside panel TA is carried out, likewise by utilising the elasticity, corresponding to the elastic link of the fastening points 41 for the outside handle holder GH on the multifunctional support.

Despite the flexibility of the arrangement a sufficient stability is still thereby guaranteed at the same time through the partially rigid link of the window guide 2 on the retaining angle 10 (in the upper terminal zone O of the elongated subsection T of the window guide 2) as well as through the partially rigid link of the door lock on the multifunctional support (through the fastening point 23, 23a which is reinforced through a rib 24).

The invention claimed is:

1. A multifunctional support for a motor vehicle having a vehicle longitudinal axis, the multifunctional support comprising:
   a retaining section configured to fasten to an assembly support of a door of the motor vehicle;
   an elongated window guide connected to the retaining section for guiding a window pane; and
   fastening points configured for fastening a door lock to the multifunctional support;
   wherein the retaining section is connected to the window guide along a longitudinally extended subsection of the window guide, the longitudinally extended subsection having two terminal zones and extends generally parallel to a longitudinal axis of said window guide between the two terminal zones;
   wherein the retaining section is connected substantially rigidly to the window guide in one of the terminal zones of the longitudinally extended subsection and the retaining section is connected flexibly to the window guide in the other of the terminal zones of the longitudinally extended subsection;
   wherein the flexible connection in the other terminal zone of the subsection comprises at least one deformable region, the deformable region being deformable in a direction generally parallel to the vehicle longitudinal axis and thus enabling a displacement of the retaining section relative to the window guide along the vehicle longitudinal axis and perpendicular to direction of the subsection between the two terminal zones of the subsection; and
   wherein the retaining section and the window guide are formed as a unitary continuous one-piece part.

2. The multifunctional support according to claim 1, wherein at least one of the fastening points for the door lock is adjacent the other terminal zone of the longitudinally extended subsection.

3. The multifunctional support according to claim 1, wherein the retaining section includes a recess between the two terminal zones.

4. The multifunctional support according to claim 1, wherein the multifunctional support includes fastening points for attaching a security cover thereto for covering portions of the door lock when the door lock is fastened to the multifunctional support.

5. The multifunctional support according to claim 1, wherein the multifunctional support includes a bearing section for a holder of an outside handle of the door.

6. The multifunctional support according to claim 5, wherein fastening points for the holder are flexibly linked to the bearing section.

7. The multifunctional support according to claim 1, wherein the deformable region is formed on at least one of the retaining section and the window guide.

8. The multifunctional support according to claim 1, further comprising a guide for introducing the window pane into a guide channel of the window guide.

9. The multifunctional support according to claim 1, wherein the deformable region is integrated in one piece with the retaining section.

10. The multifunctional support according to claim 1, comprising at least one holder for an electric cable.

11. The multifunctional support according to claim 1, wherein the retaining section and the window guide are made of plastic.

12. The multifunctional support according to claim 1, wherein the fastening points comprise two fastening points disposed on opposite sides, one on each side of the deformable region.

13. The multifunctional support according to claim 12, wherein one of the two fastening points for the door lock is provided on the retaining section and the other one of the two fastenings point is provided on the window guide.

14. The multifunctional support according to claim 13, wherein one of said two fastening points for the door lock has a sliding guide so that the door lock is displaceable relative thereto.

15. The multifunctional support according to claim 1, wherein the retaining section is movable relative to the window guide along of the vehicle longitudinal axis and a horizontal transverse vehicle axis.

16. The multifunctional support according to claim 1, wherein a first fastening point of said fastening points for the door lock provides a play connection so that when the door lock is fastened to the multifunctional support, the door lock has restricted movement relative to the first fastening point and wherein a second fastening point of said fastening points for the door lock provides a fixed connection so that when the door lock is fastened to the multifunctional support, the door lock is fixed to the second fastening point.

17. The multifunctional support according to claim 16, wherein said retaining section includes a recess between the two terminal zones of the subsection, and wherein the first fastening point projects over the recess.

18. The multifunctional support according to claim 16, wherein the first fastening point is arranged on a region of said multifunctional support which deforms differently from a region of the multifunctional support the second fastening point is arranged on.

19. The multifunctional support according to claim 16, wherein the first fastening point for the door lock has a sliding guide so that when the door lock is fastened to the multifunctional support, the door lock is displaceable relative to the first fastening point and the first fastening point has a detent element which forms a stop.

20. The multifunctional support according to claim 1, wherein the window guide has two fastening locations, spaced out from each other along the longitudinal axis of the window guide for fastening the window guide to a door body of the door, wherein the fastening locations lie, respectively, at opposite ends of the elongated window guide.

21. The multifunctional support according to claim 20, wherein one of the fastening points for fastening the door lock to the multifunctional support is mounted between the two fastening locations for fastening the window guide to the door body.

22. The multifunctional support according to claim 21, wherein one of the fastening points comprises a flat contact surface.

23. The multifunctional support according to claim 1, wherein a substantially rigid link at the one of the terminal zones where the retaining section is substantially rigidly connected to the window guide acts as a fulcrum when the retaining section is displaced relative to the window guide at the other of the terminal zones.

* * * * *

UNITED STATES PATENT AND TRADEMARK OFFICE
CERTIFICATE OF CORRECTION

| | | |
|---|---|---|
| PATENT NO. | : 7,793,464 B2 | |
| APPLICATION NO. | : 10/559604 | |
| DATED | : September 14, 2010 | |
| INVENTOR(S) | : Rolf Bucker et al. | |

It is certified that error appears in the above-identified patent and that said Letters Patent is hereby corrected as shown below:

Column 8, Claim 12, line 40    Delete ", one on each side"

Column 8, Claim 13, line 45    Delete "fastenings point" Insert -- fastening points --

Signed and Sealed this
Seventeenth Day of May, 2011

David J. Kappos
*Director of the United States Patent and Trademark Office*